United States Patent
Sanso et al.

(10) Patent No.: US 11,361,096 B2
(45) Date of Patent: Jun. 14, 2022

(54) CONTROLLED PUBLICATION OF SENSITIVE DATA WITHIN AN ESTABLISHED TIMEFRAME

(71) Applicant: Adobe Inc., San Jose, CA (US)

(72) Inventors: Antonio Sanso, Duggingen (CH); Tommaso Teofili, Rome (IT)

(73) Assignee: ADOBE INC., San Jose, CA (US)

( * ) Notice: Subject to any disclaimer, the term of this patent is extended or adjusted under 35 U.S.C. 154(b) by 30 days.

(21) Appl. No.: 16/513,961

(22) Filed: Jul. 17, 2019

(65) Prior Publication Data

US 2021/0019435 A1    Jan. 21, 2021

(51) Int. Cl.
*G06F 21/62* (2013.01)
*G06F 16/25* (2019.01)

(52) U.S. Cl.
CPC ........ *G06F 21/6218* (2013.01); *G06F 16/252* (2019.01); *G06F 2221/2103* (2013.01)

(58) Field of Classification Search
CPC ............... G06F 21/6218; G06F 16/252; G06F 2221/2103
See application file for complete search history.

(56) References Cited

U.S. PATENT DOCUMENTS

| 2014/0280936 A1* | 9/2014 | Nandagopal ............ H04L 67/22 709/225 |
| 2016/0248718 A1* | 8/2016 | MacKinnon ...... H04L 29/08072 |
| 2020/0389312 A1* | 12/2020 | Boneh ................... H04L 9/3218 |

* cited by examiner

*Primary Examiner* — Peter D Nolan
*Assistant Examiner* — Roy Rhee
(74) *Attorney, Agent, or Firm* — F. Chau & Associates, LLC (57) ABSTRACT

Certain embodiments involve controlling the timing of digital publication of sensitive data over a data network, especially in a case where a requirement exists to publish the sensitive data within an established timeframe. For instance, a computing system receives from a client device a request to publish sensitive data. The computing system provides to the client device a challenge useable as input to a verifiable delay function (VDF), responsive to the request. The computing system receives a response to the challenge along with the sensitive data and verifies that the response is a solution to the VDF applied to the challenge. Based on verifying the solution, the computing system publishes the sensitive data.

14 Claims, 4 Drawing Sheets

CONTROLLED PUBLICATION OF SENSITIVE DATA WITHIN AN ESTABLISHED TIMEFRAME

TECHNICAL FIELD

This disclosure generally relates to controlling the electronic distribution of sensitive data over data networks. More specifically, but not by way of limitation, this disclosure relates to controlling the timing of digital publication of sensitive data over a data network, especially in a case where a requirement exists to publish the sensitive data within an established timeframe.

BACKGROUND

Digital publication has become a ubiquitous form of making information available to the public or to a select group. Digital publications are virtually instant and can be made widely available without the cost of printing. With the advent of digital publication, large amounts of data can be stored remotely or stored locally in a relatively small form factor.

SUMMARY

Certain embodiments involve controlling the timing of digital publication of sensitive data over a data network, especially in a case where a requirement exists to publish the sensitive data within an established timeframe. For instance, a computing system receives from a client device a request to publish sensitive data. In an illustrative example, the computing system receives a request to publish financial data, where that financial data is required to be published within an established timeframe. The computing system provides to the client device a challenge useable as input to a verifiable delay function, responsive to the request. In the continuing example, for instance, at fifteen minutes prior to the beginning of the established timeframe, the computing system transmits to the client device a challenge within the domain of a verifiable delay function having a solution time of fifteen minutes. The computing system receives a response to the challenge along with the sensitive data and verifies that the response is a solution to the verifiable delay function applied to the challenge. More specifically, in the example, the computing system receives a solution at the beginning of the established timeframe and verifies the solution. Based on verifying the solution, the computing system publishes the sensitive data. In the continuing example, the computing system publishes the financial data at the beginning of the established timeframe based on verifying the accuracy of the solution received.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

The present disclosure includes systems and methods for controlling the timing of digital publication of sensitive data over electronic data networks, particularly in cases where a strict publication timeframe applies. As described above, current mechanisms for publishing digital data within a strict timeframe are error prone. Certain embodiments described herein utilize a verifiable delay function (VDF) to precisely time the upload of digital data at a publication server, thereby ensuring that the upload of the digital data occurs at a specific time or within a specific timeframe. Embodiments of this disclosure need not rely upon local timekeeping of a client device, and thus, a layer of potential errors in the publication process is eliminated.

The following non-limiting example is provided to introduce certain embodiments. In this simplified example provided for illustrative purposes, a financial institution is required to publish sensitive financial data within a narrow publication timeframe, specifically, between 9:00 am and 9:15 am on a certain day. The financial institution operates a client device, such as a local computer, and a publisher runs a publication server located remotely from the client device. To publish the financial data, the client device of the financial institution must ensure that the financial data is received by the publication server within the publication timeframe. Once uploaded to the publication server, the financial data becomes public and, thus, is deemed published.

To begin the publication process, the client device transmits to the publication server a request to publish the financial data, and the publication server receives the request. The publication server determines a challenge to be used as input into a verifiable delay function (VDF). A VDF is a function that requires sequential work that is non-parallelizable, such that the VDF cannot be solved in less than a predetermined amount of time, referred to herein as the target solution time. Sequential work involves executing a series of steps requiring performance of one step before commencement of a subsequent step, rather than executing a set of parallel operations where one operation can be commenced without the completion of another operation. In contrast, parallelizable work includes multiple operations that can be performed in parallel without impacting the accuracy of an end result, such that a first step of the computational work and a second step of the computational work are able to be performed simultaneously because neither the first step not the second step depends on the other. In this example, the VDF is selected or tuned to ensure that the VDF will be solved at a time at or toward the beginning of the publication timeframe, but no sooner than the beginning of the publication timeframe. In this example, the request was received at least fifteen minutes prior to the publication timeframe, and the VDF was previously tuned to have a fifteen-minute target solution time, given an input. At fifteen minutes prior to the beginning of the publication timeframe (e.g., at 8:45 am), the publication server determines a challenge and transmits the challenge to the client device in response to the request.

The client device solves the VDF using the challenge as input. Calculating the solution takes fifteen minutes, which is the target solution time for the VDF. Because the challenge was provided to the client device fifteen minutes prior to the publication timeframe, the client device has the solution at the beginning of the publication timeframe, and no sooner than the beginning of the publication timeframe. The client device transmits the solution to the publication server along with the financial data desired to be published. Thus, the publication server does not receive the financial data prior to the publication timeframe, and there is therefore no risk of the financial data being stored on the publication server and detected by a malicious party or otherwise prior to the publication timeframe.

The publication server verifies the solution. A characteristic of VDFs is that their solutions can be verified relatively quickly. Thus, in this example, the solution is verified quickly enough such that verification occurs at the beginning of the publication timeframe (e.g., within the first seconds). Responsive to verifying the solution, the publication server accepts the sensitive data for publication and, thus, stores the sensitive data in a manner that is public.

As described herein, certain embodiments provide improvements to computing environments used for digital publication of data by solving one or more problems that are specific to the publication of data in the digital realm. For instance, given a requirement to publish digital data within a specific timeframe in the future, modern computing devices tend to perform such a task too quickly, especially given the use of parallelization in many computing systems. After beginning a task, parallelization in modern computing systems can enable that task to be completed very quickly. When precise timing is key, however, this speed can be a drawback. Through the use of a verifiable delay function, certain embodiments of the invention force a computing system to take a predetermined amount of time to complete a task, specifically, providing digital data for publication, which leads to publication within a target timeframe.

As an illustrative example, publishers of digital content exist in numerous fields, including the book industry, the financial industry, and the academic industry. Occasionally, circumstances call for the precise timing of digital publication. For example, some periodicals, newspapers, and book publishers attempt to publish both digital and hard-copy versions of their content simultaneously. Certain authors and publishing houses have business models based on a staged release of new novels, where a hardcover version is released first, simultaneously with a digital version, followed later by a paperback version. For yet another example, there are sometimes regulatory or business considerations that dictate the timing of digital publications. At the end of each financial quarter, many financial institutions and companies are required to publish financial reports within a specific timeframe, which may allow only a specific fifteen-minute span on a specific day. In some cases, an institution must publish a financial report precisely within the timeframe, and failure to comply risks both financial and reputational harm.

Publishers of content face difficulties relating to releasing their content for publication at an appropriate time. Typically, personnel of the institution maintaining the content waits until the publication timeframe opens, or just before the timeframe in the case where the content is a large amount of data, and then manually begins the upload of the data to a publication server. Alternatively, the process may be automated, such that an automated user initiates the upload when the publication timeframe begins. In either case, however, the process is error prone. A human administrator can become overwhelmed by other tasks and, as a result, may fail to complete the upload before the end of the publication timeframe. An automated user may be prone to fewer errors, but if the automated user does not have access to accurate time, then the institution could still fail to meet the publication timeframe. Although use of a VDF as described herein is useful to assist an automated user in publishing digital data during a target publication timeframe, this solution described herein is not applicable in the case of a human administrator providing the data to be published based on manual timing or manual reference to a clock. More specifically, given the precise timing requirements, evaluating a VDF by hand is impractical and, further, would not successfully ensure publication within a publication timeframe as described herein.

The precise timing requirements of certain situations can be addressed by certain embodiments described herein, which use a VDF as part of a challenge, thereby causing computing systems to perform actions requiring a predetermined amount of time. Thus, certain embodiments prevent inadvertent early publication via a digital platform.

An example of a verifiable delay function is a function that is both sequential and efficiently verifiable. Given a VDF $f(x)$, a solution $f(x)=y$ can be computed in no less than T sequential steps, also referred to as cycles, even using parallelism, and that solution can be verified in a short amount of time, for instance, in $\log(T)$ time or in polylogarithmic time. A verifiable delay function is associated with a corresponding verification function, useable to verifiable that a given value is a solution to the VDF applied to a given input. In some embodiments, a verifiable delay function guarantees that a solution cannot be calculated in less than a target solution time to which the verifiable delay function is tuned through an appropriate quantity of sequential steps. Furthermore, an example of a challenge or challenge input is a value useable as input to a verifiable delay function. Thus, an example of a challenge is a value within a domain of a VDF for which the challenge is to be used as input. In some embodiments, a server sends a challenge to a client, and the client uses the challenge as input into a VDF to generate a solution. The server is able to verify the solution by providing the solution and the challenge as input into the verification function corresponding to the VDF.

Certain embodiments described herein facilitate the publication of data within a specific timeframe. More specifically, certain embodiments utilize a series of procedures and sequential computational work with precise timing factors to ensure that data is not stored on a public server prior to the time at which that data is allowed to be made public. As described in the above example, a VDF is used to precisely time upload of sensitive data to a publication server. The VDF performs computational work in a sequence of cycles applied to input data, utilizing the output data of one cycle as input data into the next cycle, and tailored to be completed in no less time than a predetermined target solution time. Further, the VDF enables quick verification, for instance, in logarithmic time or polylogarithmic based on the number of cycles. The use of the VDF enables precise timing to ensure that the sensitive data becomes accessible on a publication server no sooner than a publication timeframe and, further, is published quickly when the publication timeframe opens. As a result, sensitive data is not stored on the publication server until the publication timeframe.

Figure 1:
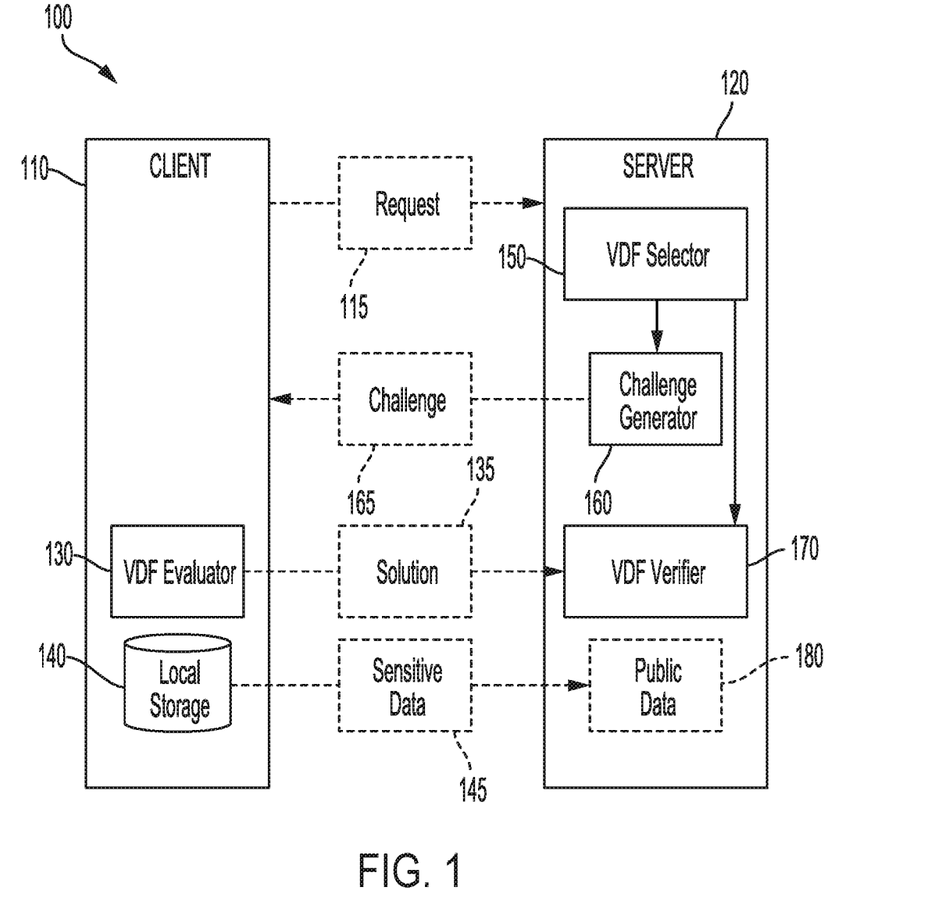
FIG. 1 shows an example of a communications flow of a publication system for publishing sensitive data, according to certain embodiments of the present disclosure.

Referring now to the drawings, FIG. 1 shows an example of a communications flow of a publication system 100 for publishing sensitive data 145, according to certain embodiments of the present disclosure. Sensitive data 145 could include data directed for publication no sooner than a scheduled publication timeframe, such that the sensitive data 145 is to remain confidential until the publication timeframe. Examples of sensitive data 145 include confidential program code, financial data, confidential work product, medical patient-related data, data including the contents of a book, or data related to experimental results. The publication timeframe could be, for instance, a span of time having a start time and an optional end time, where data associated with the publication timeframe is intended to be published no earlier than the start time. One example of a publication timeframe has an end time as well, in which case the associated data is intended to be published prior to the end time. However, another example of a publication timeframe is open-ended and, thus, has no end time, in which case the associated data is intended to be published any time after the start time.

As shown in FIG. 1, the publication system 100 involves a client 110 and a server 120. Each of the client 110 and the server 120 includes hardware, software, or a combination of both. For instance, the client 110 is a computing device or client application running on a computing device and is capable of performing the tasks described herein as performed by the client 110, and the server 120 is a computing device or a server application running on a computing device and is capable of performing the tasks described herein as performed by the server 120.

As discussed in detail below, embodiments of the publication system 100 utilize a verifiable delay function. VDFs were developed largely for the purpose of committee selection. For example, in the field of blockchains, a user might be restricted from submitting a new block to add to a blockchain until after generating a solution to a VDF given an input that is widely available, thus ensuring that no participant has an advantage with respect to timing. Generally, a VDF is both sequential and efficiently verifiable. More specifically, using a VDF f(x), a user can compute f(x)=y in T sequential steps, and a user can verify the solution, y=f(x), in a short amount of time, such as log(T) or polylog(T) time. Although only a few VDFs have been developed, it will be understood that additional VDFs may be developed and that an existing or future VDF is useable in an embodiments described herein. One of skill in the art will understand how to set up and utilize a VDF as described herein.

Generally, an instance of a VDF includes one or more sequential steps, or cycles, where the quantity of sequential steps determines a target solution time for the VDF. Thus, a VDF can be tuned to a target solution time (i.e., the time required to solve the VDF) by modifying the number of cycles performed. The specific operations performed in each cycles are dependent on the type of the VDF, and there are currently three known VDF types although more may be developed over time. Because of the use of one cycle's output as the next cycle's input, the various cycles are not parallelizable. Thus, given a VDF with an established quantity of cycles, T, which is determined based on the target solution time, and given a challenge to use as an initial input, the VDF generally cannot be solved in less than the target solution time.

An example of the client 110 incorporates one or more of a VDF evaluator 130 and a local storage 140, in which sensitive data 145 is stored at least temporarily. For example, the local storage 140 is a hard drive or flash drive. An example of the server 120 incorporates one or more of a VDF selector 150, a challenge generator 160, a VDF verifier 170, and public data 180. Generally, the client 110 transmits to the server 120 a request 115 to publish the sensitive data 145, which begins a series of operations as follows: If the VDF being used is not yet set up, the VDF selector 150 selects a specific VDF (e.g., a VDF type and quantity of cycles) to use.

The challenge generator 160 generates a challenge 165, which is a value with in the domain of the VDF, and which is transmitted to the client 110. The VDF evaluator 130 applies the VDF to the challenge 165 to generate a solution 135 and transmits the solution 135 to the server 120 along with a data payload, specifically, the sensitive data 145. Upon receipt of the solution 135, the VDF verifier 170 verifies the solution 135. Responsive to the verification, the server 120 accepts the sensitive data 145 from the client 110 and stores the sensitive data 145 in a set of public data 180 on the server 120. In some embodiments, the public data 180 is maintained in a local storage of the server 120, which is publicly accessible. Thus, upon saving the sensitive data 145 in the public data 180, the server 120 publishes the sensitive data 145.

The VDF selector 150 could include hardware or software, or a combination of both, that sets up a VDF for use. Currently, three types of VDFs are known, and additional VDF types may be discovered in the future. Certain embodiments of a server 120 have access to more than a single type of VDF, and thus, the VDF selector 150 selects a VDF type for use by a client 110 in a process of publishing sensitive data responsive to a request 115 from the client 110. More specifically, for instance, the VDF selector 150 selects a type of VDF to use or generates a specific VDF with a fixed quantity of sequential steps, or both.

A challenge generator 160 could include hardware or software, or a combination of both, that generates a challenge 165 to be used as input to a VDF. The challenge generator 160, in one example, is aware of a domain of a VDF that will use the challenge 165 and, thus, utilizes a pseudo-random number generator or other mechanism to generate the challenge 165 within such domain. In some embodiments, a challenge generator 160 generates a challenge 165 to be transmitted to the client device 110 responsive to the request 115 for publication of sensitive data 145.

The VDF evaluator 130 could be hardware or software, or a combination of both, that calculates a solution 135 to a VDF. One example of the VDF evaluator 130 is coded for a specific instance of a VDF, including, for instance, a specific VDF type and quantity of cycles, and the VDF evaluator 130 calculates a solution 135 based on an input. Another example of the VDF evaluator 130 is coded for a specific type of VDF and receives an indication of the quantity of cycles and an input, and the VDF evaluator 130 calculates the solution 135 based on the input, utilizing the quantity of cycles indicated.

The VDF verifier 170 could be hardware or software, or a combination of both, that verifies a purported solution 135 to a VDF. As described above, a VDF is associated with a corresponding verification function, and thus, in some embodiments, a VDF verifier 170 implements a verification function corresponding to a VDF. Given an input (e.g., a challenge 165) and a purported solution 135, an example of the VDF verifier 170 verifies that the purported solution 135 is accurate. In certain embodiments, the VDF verifier 170 encodes, or is otherwise aware of, the quantity of cycles in the VDF, and thus, the VDF verifier 170 verifies the purported solution 135 based on this quantity of cycles. Alternatively, however, the VDF verifier 170 receives the quantity of cycles as input along with the input and the purported solution 135, and thus, the VDF verifier 170 verifies the purported solution 135 based on this quantity of cycles.

In some embodiments, the VDF evaluator 130 of the client 110 and the VDF selector 150, the challenge generator 160, and the VDF verifier 170 of the server 120 are implemented as hardware, software, or a combination of both. For instance, in one embodiment, each of the VDF evaluator 130, the VDF selector 150, the challenge generator 160, and the VDF verifier 170 is implemented as a software function. For another example, however, one or more of the VDF evaluator 130, the VDF selector 150, the challenge generator 160, and the VDF verifier 170 are implemented as specialized hardware devices, such as a field-programmable gate array. Although the VDF selector 150, the challenge generator 160, and the VDF verifier 170 of the server 120 are shown and described herein as being distinct components, this division is made for illustrative purposes only, so as to describe various operations performed in certain embodiments. In other embodiments, these components are further divided or are integrated together in various combinations. For instance, in one embodiment, the VDF selector 150, the challenge generator 160, and the VDF verifier 170 are integrated together into a single software program or function. It will be understood that various implementations are possible to perform the operations described in this disclosure.

Although only a single client 110 is shown in FIG. 1, it will be understood that various clients 110 participate in some embodiments of the publication system 100. For instance, each client 110 includes a respective set of sensitive data 145 to be published during a respective publication timeframe. To this end, each such client 110 transmits a publication request to the server 120, receives a responsive challenge 165 from the server 120, evaluates a VDF with the challenge 165 as input, and provides a solution along with the respective sensitive data 145. Each client 110 need not receive the same challenge, and further, each client 110 need not utilize the same specific VDF, as long as the server 120 is aware of which VDF is being used so as to enable the server 120 to verify each solution 135.

Figure 2:
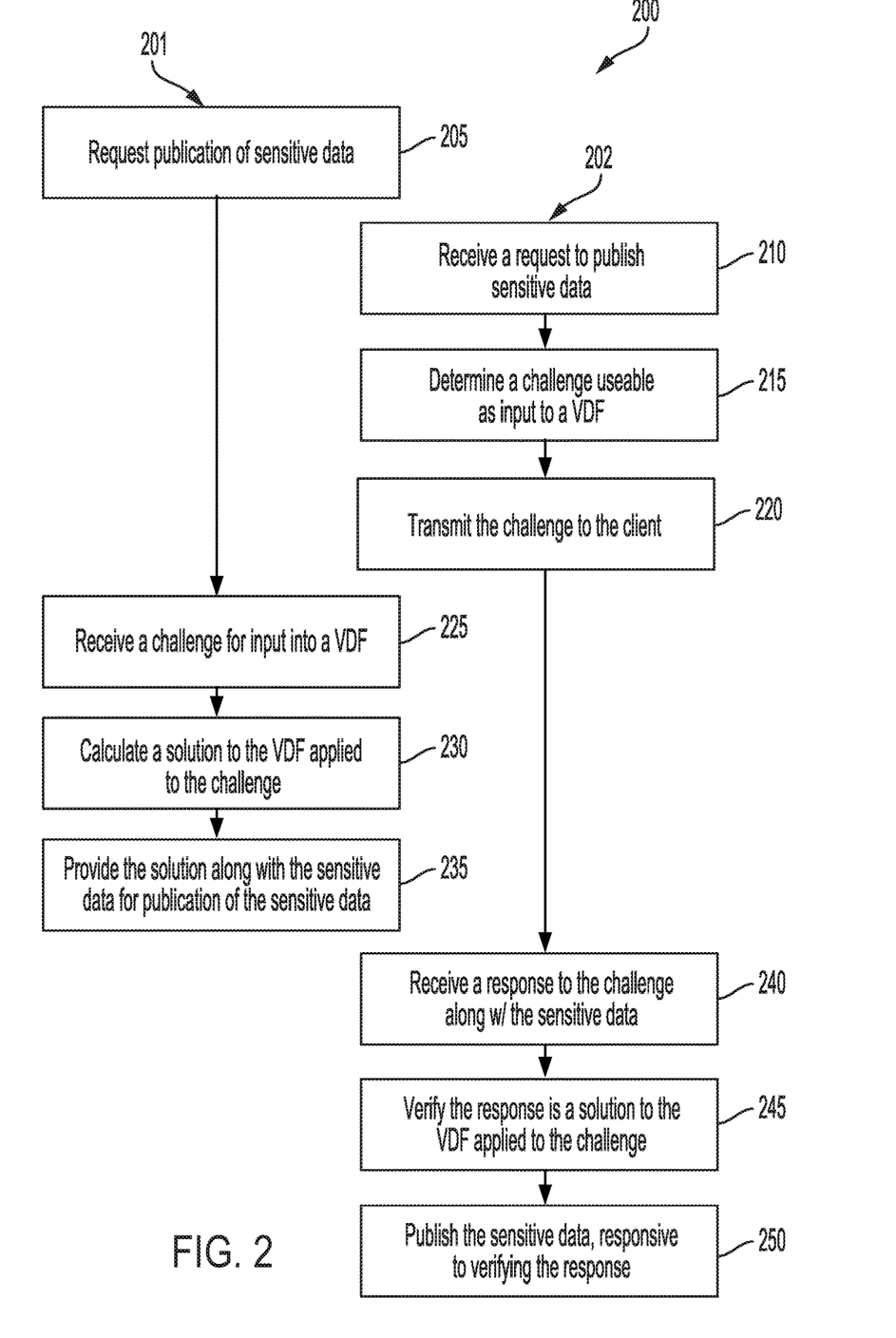
FIG. 2 shows an example of a process of publishing sensitive data, according to certain embodiments of the present disclosure.

FIG. 2 shows an example of a process 200 of publishing sensitive data, according to certain embodiments of the present disclosure. As shown in FIG. 2, some operations of the process 200 are performed by the client 110 while other operations are performed by the server 120. In an example embodiment, the process 200 includes a client process 201 of operations performed by the client 110 and a server process 202 of operations performed by the server 120. Through these sub-processes, the client 110 and server 120 coordinate to publish, to the server 120, sensitive data 145 provided by the client 110.

At block 205 of the client sub-process 201, the client 110 transmits to the server 120 a request 115 to publish sensitive data 145. In some embodiments, the sensitive data 145 is initially stored in the local storage 140 of the client 110, and in this example process 200, the sensitive data 145 is not transmitted to the server 120 along with the request 115. Rather, the client 110 sends the sensitive data 145 to the server 120 only upon determining a solution 135 to a VDF, as described further below. At a minimum, for example, the request 115 is an indication that the client 110 has sensitive data 145 to be published on the server 120. An example request also includes an indication of a publication timeframe during which the sensitive data 145 should be published. However, additionally or alternatively, the publication timeframe is already known, such as when the server 120 is configured to publish sensitive data 145 within a predetermined publication timeframe or when the publication timeframe is established by regulation or other centralized rule known to the server 120.

The sensitive data 145 itself is one or more of various types. For example, and not by way of limitation, the sensitive data 145 is financial data, confidential program code, medical patient-related data, data including the contents of a book, or data related to experimental results. Generally, an example of the sensitive data 145 is confidential for some reason and is desired to remain confidential until a certain time, which is the beginning of the publication timeframe for that sensitive data 145.

At block 210 of the server process 202, the server 120 receives the request 115 to publish sensitive data 145. In this example, the server 120 does not yet receives the sensitive data 145 itself.

Although not shown in FIG. 2, in some embodiments, the server 120 determines a VDF responsive to the request 115. For instance, to determine the VDF, the VDF selector 150 selects from a set of known VDFs types, or the VDF selector 150 tunes a selected VDF type to a target solution time, such as by selecting an appropriate quantity of cycles, T. An example VDF selector 150 tunes the VDF to a target solution time selected to be the time until the beginning of the publication timeframe for the sensitive data 145 to be published, such that the VDF takes until the publication timeframe to solve. In some embodiments, the computation of a cycle has been timed, and the quantity of cycles is chosen based in part on the time to complete the computation of a cycle. In an example such embodiment, the number of cycles, T, is selected such that T multiplied by the time to complete a cycle equals the target solution time. An alternative example of the server 120 utilizes a predetermined VDF, for which a VDF type and quantity of cycles has already been determined for a target solution time. For example, and not by way of limitation, the server 120 utilizes a single VDF with a fixed quantity of cycles tuned to a target solution time known to the server 120. In this alternative example, no VDF selector 150 is used, and the server 120 waits until a time equal to the beginning of the publication timeframe less the target solution time to transmit a challenge 165 to the client 110.

Responsive to the request 115, at block 215, the challenge generator 160 of the server 120 determines a challenge 165 useable as input to a VDF. More specifically, the challenge is generated to be within a domain of the VDF being used. If the client 110 knows the challenge in advance, the client 110 can potentially solve the VDF prior to the publication timeframe, which is undesirable. Thus, in some embodiments, to prevent the client 110 from knowing the challenge 165 in advance, the challenge generator 160 includes a pseudo-random number generator, which generates the challenge 165, where the seed to the pseudo-random number generator is not known to the client 110.

At block 215, the server 120 transmits the challenge 165 to the client 110 responsive to the request 115. In some embodiments, the server 120 additionally transmits an indication of the VDF, such as an indication of the VDF type or quantity of cycles or such as a pointer to a cloud-based function for solving the VDF.

At block 225 of the client process 201, the client 110 receives the challenge 165. In some embodiments, the client 110 additionally receives an indication of the VDF. If no indication of the VDF is used, an example client 110 utilizes a predetermined VDF that has previously been set up. Another example client 110 sets up a VDF based on an indication of VDF type received from the server 120 or based on an indication of a quantity of cycles received from the server 120, or both.

At block 230, the client 110 calculates a solution 135 to the VDF using the challenge 165 as input to the VDF. More specifically, the VDF evaluator 130 of the client evaluates the VDF as applied to the challenge 165. It will be understood that the VDF evaluator 130 can take various forms. For example, and not by way of limitation, the VDF evaluator 130 is a software program that takes an input, specifically, the challenge 165, and performs the operations of multiple cycles of the VDF, using each output of a cycle as input into the following cycle for the quantity of cycles for which the VDF is tuned. In some embodiments, because of the use of the VDF, which is tuned to a target solution time and thus takes until the publication timeframe to solve, the client 110 completes evaluation of the VDF no earlier than the publication timeframe (i.e., the beginning of the publication timeframe).

At block 235, the client 110 transmits the solution 135 to the server 120. In this example, along with the solution 135, the client 110 also transmits to the server 120 the sensitive data 145 to be published. In some embodiments, the client 110 transmits the sensitive data 145 to the server 120 no sooner than transmitting the solution 135. Additionally or alternatively, in some embodiments, the client 110 does not upload the sensitive data 145 to the server 120 until the publication timeframe, since the target solution time of the VDF is such that the VDF is not solvable until the publication timeframe.

At block 240, the server 120 receives from the client 110 the solution 135 and the sensitive data 145. In some embodiments, the sensitive data 145 is received no sooner than the solution 135. At block 245, the server 120 verifies that the solution 135 provided by the client 110 is an accurate solution to the VDF. As described above, a VDF allows for fast verification of a solution. Thus, in this example, the VDF verifier 170 of the server 120 verifies the solution 135 provided by the client quickly (e.g., in polylog(T) time) through the use of the verification function corresponding to the VDF used. Generally, in some embodiments, the verification function is established as part of setting up the VDF, and one skilled in the art will understood how to generate and use such a verification function.

At block 250, upon verifying the solution 135, the server 120 publishes the sensitive data 145, making the sensitive data 145 part of a set of public data 180 available on the server 120. For instance, the server 120 accepts the upload of the sensitive data 145 provided by the client 110 and stores the sensitive data 145 with public access. In some embodiments, the publication of the sensitive data 145 includes making sensitive data accessible to the public or to a limited group on the server 120. According to some embodiments, sensitive data 145 is deemed published upon being uploaded to the server 120.

Figure 3:
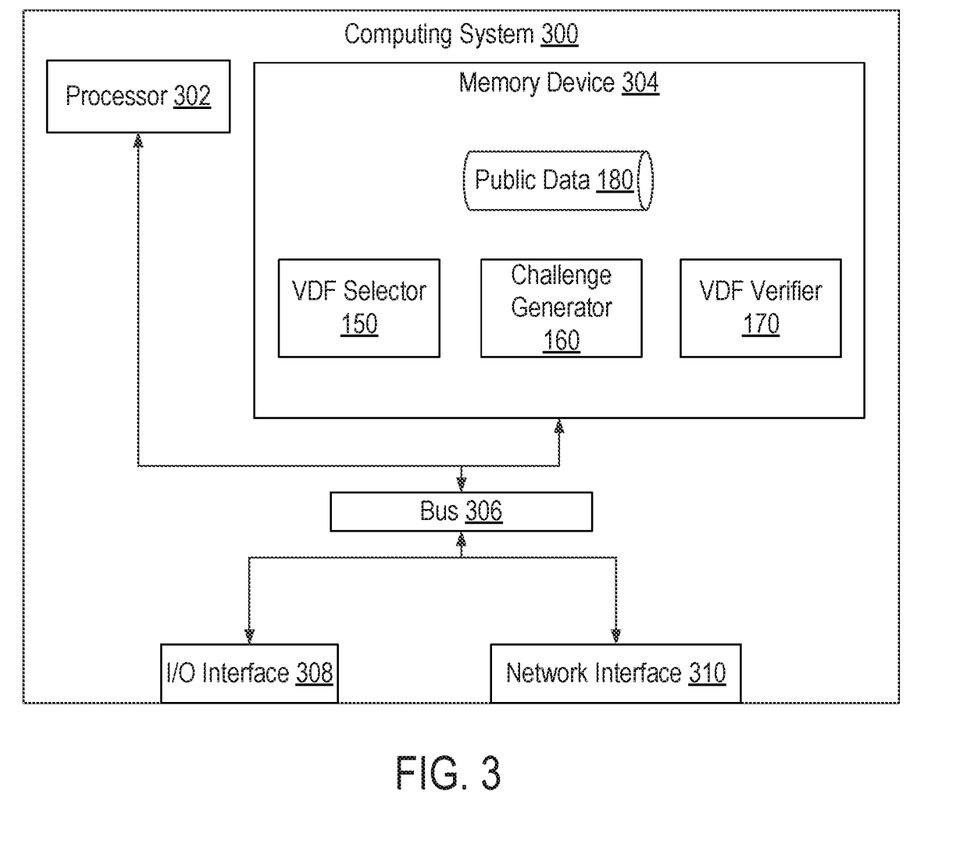
FIG. 3 shows an example of a computing system that performs certain operations described herein, according to certain embodiments of the present disclosure.

FIG. 3 shows an example of a computing system 300 that performs certain operations described herein, according to certain embodiments of the present disclosure. Specifically, for instance, the computing system 300 shown is the server 120. However, this computer system 300 is not a limiting example of the server 120. Any suitable computing system or group of computing systems can be used for performing the operations described herein. The example computing system 300 executes a VDF selector 150, a challenge generator 160, and a VDF verifier 170. In other embodiments, however, the server 120 is distributed and a separate computing system having devices similar to those depicted executes one or more of the VDF selector 150, the challenge generator 160, and the VDF verifier 170.

The depicted example of a computing system 300 includes a processor 302 communicatively coupled to one or more memory devices 304. The processor 302 executes computer-executable program code stored in a memory device 304, accesses information stored in the memory device 304, or both. Examples of the processor 302 include a microprocessor, an application-specific integrated circuit ("ASIC"), a field-programmable gate array ("FPGA"), or any other suitable processing device. The processor 302 can include any number of processing devices, including a single processing device.

The memory device 304 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 300 may also include a number of external or internal devices, such as input or output devices. For example, the computing system 300 is shown with one or more input/output ("I/O") interfaces 308. An I/O interface 308 can receive input from input devices or provide output to output devices. One or more buses 306 are also included in the computing system 300. The bus 306 communicatively couples together one or more components of the computing system 300.

The computing system 300 executes program code that configures the processor 302 to perform one or more of the operations described herein. The program code includes, for example, the VDF selector 150, the challenge generator 160, the VDF evaluator 130, or other suitable applications that perform one or more operations described herein. The program code may be resident in the memory device 304 or any suitable computer-readable medium and may be executed by the processor 302 or any other suitable processor. In some embodiments, the VDF selector 150, the challenge generator 160, and the VDF verifier 170 are stored in the memory device 304, as depicted in FIG. 3. In additional or alternative embodiments, one or more of the VDF selector 150, the challenge generator 160, and the VDF verifier 170 are stored in different memory devices of different computing systems. In additional or alternative embodiments, the program code described above is stored in one or more other memory devices accessible via a data network. Further, in some embodiments, the public data 180, including uploaded sensitive data 145, is stored in the memory device 304, as in the example depicted in FIG. 3.

The computing system 300 also includes a network interface device 310, useable as an interface for communications with one or more clients 110, for example. The network interface device 310 includes any device or group of devices suitable for establishing a wired or wireless data connection to one or more data networks. Non-limiting examples of the network interface device 310 include an Ethernet network adapter, a modem, and the like. The computing system 300 is able to communicate with one or more other computing devices (e.g., a client 110) via the data network using the network interface device 310.

Figure 4:
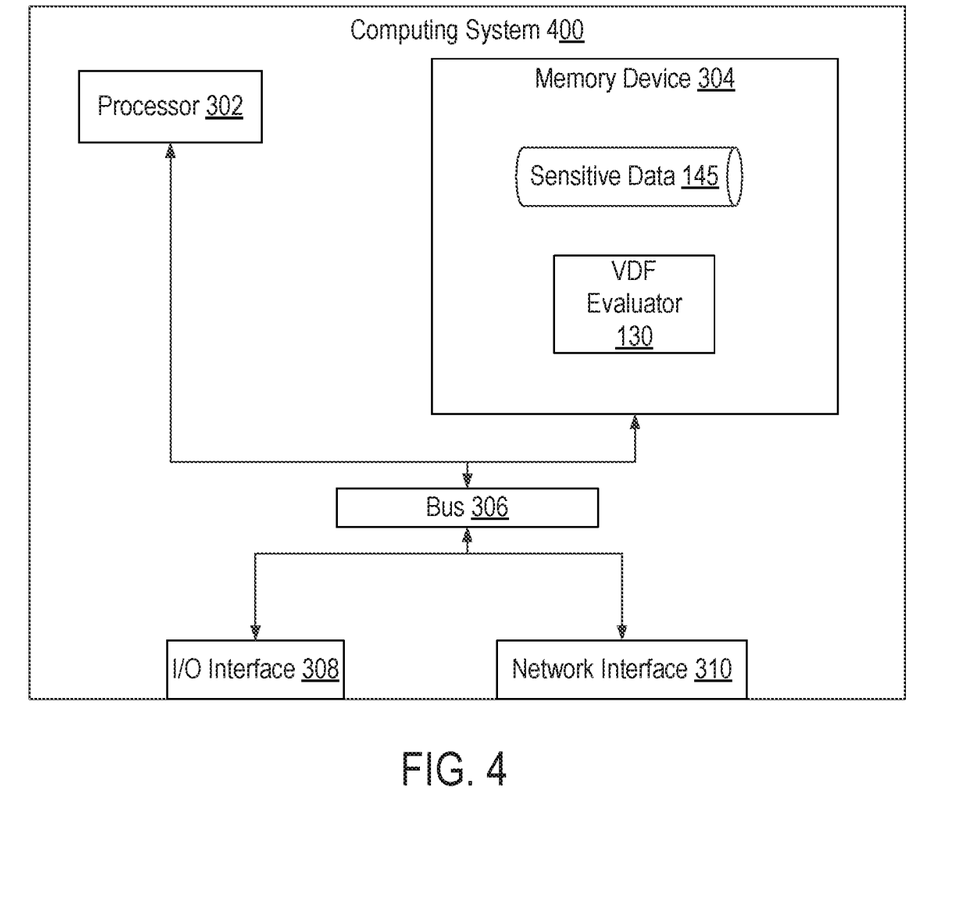
FIG. 4 shows another example of a computing system that performs certain operations described herein, according to certain embodiments of the present disclosure.

FIG. 4 shows another example of a computing system 400 that performs certain operations described herein, according to certain embodiments of the present disclosure. Specifically, the computing system 400 of FIG. 4 is an example of a client 110. However, this computing system 300 is not a limiting example of the client 110. Any suitable computing system or group of computing systems can be used for performing the operations described herein. Acting as the client 110, the example computing system 400 executes a VDF evaluator 130, program code for which is stored in a memory device 304 of the computing system 400. Further, the local storage 140 of the client 110 includes at least a portion of the memory device 304, and thus, the sensitive data 145 is maintained in the memory device 304. Other aspects of the computing system 400 acting as the client 110, such as the processor 302, the bus 306, the I/O interface 308, and the network interface 310 may be similar to those in the server 120. In an example client 110, however, the network interface 310 is used to communicate with the server 120 over the data network, so as to receive the challenge 165 and to transmit the solution 135 and the sensitive data 145.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for publishing sensitive data comprising:
   receiving, by a server, a request to publish sensitive data from a client device within a publication timeframe;
   selecting, by the server, a verifiable delay function (VDF) having a target solution time corresponding to a time period which occurs prior to a beginning of the publication timeframe;
   providing, by the server, a challenge for the selected VDF and an indication identifying the selected VDF, to the client device; and
   publishing, by the server, the sensitive data upon verifying a solution received from the client device, wherein the solution is calculated by inputting a value of the challenge to the selected VDF, wherein the client device provides the sensitive data to the server along with the solution.

2. The method of claim 1, wherein the value of the challenge input to the selected VDF calculates the solution in no less time than the target solution time using a set number of sequential operations related to the target solution time.

3. The method of claim 2, wherein the set number of sequential operations are a plurality of sequential computations that are non-parallelizable.

4. The method of claim 1, further comprising:
   determining a time difference between receiving the request and the publication timeframe;
   the selecting comprising selecting the VDF from two or more available VDFs that calculates the solution in no less time than the target solution time based on the time difference.

5. The method of claim 1, further comprising:
   determining a time difference between receiving the request and the publication timeframe;
   the selecting comprising tuning the VDF based on the time difference to calculate the solution in no less time than the target solution time.

6. A non-transitory computer-readable medium embodying program code for publishing sensitive content, the program code comprising instructions that, when executed by a processor, cause the processor to perform operations comprising:
   receiving, a request to publish sensitive data from a client device within a publication timeframe;
   selecting a verifiable delay function (VDF) having a target solution time corresponding to a time period which occurs prior to a beginning of the publication timeframe;

providing, a challenge for the selected VDF and an indication identifying the selected VDF to the client device; and publishing the sensitive data upon verifying a solution received from the client device, wherein the solution is calculated by inputting a value of the challenge to the selected VDF, wherein the client device provides the sensitive data to a server along with the solution.

7. The non-transitory computer-readable medium of claim 6, wherein: the value of the challenge input to the selected VDF calculates the solution in no less time than the target solution time using a set number of sequential operations related to the target solution time.

8. The non-transitory computer-readable medium of claim 6, the operations further comprising:
determining a time difference between receiving the request and the publication timeframe;
the selecting comprising selecting the VDF from two or more available VDFs that calculates the solution in no less time than the target solution time based on the time difference.

9. The non-transitory computer-readable medium of claim 6, the operations further comprising:
determining a time difference between receiving the request and the publication timeframe;
the selecting comprising tuning the VDF based on the time difference to calculate the solution in no less time than the target solution time.

10. The method of claim 1, further comprising:
receiving, by the client device, the challenge and the indication identifying the selected VDF from the server;
inputting, by the client device, the value of the challenge to the selected VDF for calculating the solution; and
providing, by the client device, the solution to the server upon completing the calculating of the solution.

11. The non-transitory computer-readable medium of claim 7, wherein the set number of sequential operations are a plurality of sequential computations that are non-parallelizable.

12. A method for publishing sensitive data comprising:
sending, by a client device, a request to publish sensitive data to a server within a publication timeframe;
receiving, by the client device, a challenge and an indication from a server, wherein the indication identifies a verifiable delay function (VDF) having a target solution time corresponding to a time period which occurs prior to a beginning of the publication timeframe;
inputting, by the client device, a value of the challenge to the VDF for calculating a solution; and
providing, by the client device, the solution to the server upon completing the calculating of the solution,
wherein the server publishes the sensitive data upon verifying the solution received from the client device, wherein the client device provides the sensitive data to the server along with the solution.

13. The method of claim 12, the value of the challenge input to the selected VDF calculates the solution in no less time than the target solution time using a set number of sequential operations related to the target solution time.

14. The method of claim 13, wherein the set number of sequential operations are a plurality of sequential computations that are non-parallelizable.

* * * * *